Oct. 4, 1966   J. E. WALDRON   3,277,345
STATIC DISTANCE RELAY WITH REDUCED TRANSIENT OVERREACH
Filed Feb. 7, 1963
2 Sheets-Sheet 2

INVENTOR:
JAMES E. WALDRON,
BY Albert S. Richardson Jr.
ATTORNEY.

United States Patent Office 3,277,345
Patented Oct. 4, 1966

3,277,345
STATIC DISTANCE RELAY WITH REDUCED TRANSIENT OVERREACH
James E. Waldron, Lansdowne, Pa., assignor to General Electric Company, a corporation of New York
Filed Feb. 7, 1963, Ser. No. 256,955
14 Claims. (Cl. 317—36)

This invention relates to static distance relays for protecting electric power transmission lines, and more particularly it relates to a high-speed distance relay having a mho operating characteristic, the relay being constructed without moving parts and being designed to have a minimized overreach characteristic. My invention relates further to an improved series replica impedance circuit for utlization in such a relay.

Distance relays are used in the art of protective relaying to perform predetermined control functions, such as initiating the opening of a high-voltage circuit interrupter to isolate a section (the protected line) of an A.C. electric power system, whenever the relationship between line voltage (V) and line current (I) at the relay location is indicative of a short circuit or fault condition on the protected line. The operating characteristic of such a relay is conventionally expressed in terms of the ratio of line voltage to line current, or in other words the apparent impedance of the power system, that will cause relay operation. The actual impedance of the protected line per unit length has a determinable value, and apparent impedance during the fault condition will be a measure of the length of the line between the relay and fault locations. Therefore, such a relay is properly known as a distance relay. The distance relay is operatively responsive to the incidence of any fault so located on the line that the impedance to the fault falls within the predetermined operating range (ohmic reach) of the relay.

There are several known techniques for designing very fast operating distance relay having no moving parts. For example, such relays are disclosed in reissue patent Re. 23,430, Warrington, originally granted on June 13, 1950, and in Patent No. 2,879,454 granted to M. E. Hodges et al. on Mar. 24, 1959. Some of these prior art static designs have been arranged to have the operating characteristic of the well known mho type distance relay. In obtaining a mho characteristic it is common to supply a reference voltage, dependent on transmission line voltage, and an operating voltage comprising the vectorial combination of two component voltages derived respectively from the line voltage and current, to static circuit means appropriately designed to "operate" whenever the relationship between the line-voltage and line-current derived voltages is indicative of a fault on the line being protected. In order to develop the component voltage which is derived from line current transactors have typically been used.

A "transactor" is the name given a device having electrical characteristics similar in some respects to a conventional transformer and similar in other respects to a reactor. It comprises in effect an air-gap reactor having associated therewith primary and secondary windings, with the primary winding being energized in accordance with transmission line current and the secondary winding having a load connected thereto. The voltage developed across the secondary winding of the transactor is representative, both in magnitude and phase, of the A.C. current flowing in its primary winding. Secondary voltage is related to primary current by a complex proportionality constant or vector operator known as the transfer impedance of the transactor. Open circuit secondary voltage leads primary current by nearly 90 electrical degrees, and as the resistive load across the secondary is increased, the angle of lead becomes less.

While the secondary voltage of a loaded transactor, under all steady state conditions, accurately reflects the transmission line A.C. current from which it is derived, I have found that its transient response may be considerably different than that of the line. This is attributed to the fact that the transfer impedance of a conventional transactor is not a true replica of the line impedance, the significance of which will become clear hereinafter. In high-speed static distance relays it results in an overreach problem that will now be explained.

When a transmission line fault occurs, the fault current wave form is apt to be offset initially. Offset fault current is the resultant of a symmetrical A.C. component plus a D.C. transient component. The initial magnitude and rate of decay of the D.C. component are functions of a combination of several variable factors: the prefault load angle; the fault incidence angle; and the ratio of reactance to resistance of that portion of the electric power system through which fault current flows. Although direct current in the transmission line is not itself reproduced in the secondary voltage of a transactor, rapid decay of a D.C. component so affects the rate of change of the offset fault current that the transactor secondary voltage will initially be offset. As a result, when a fault occurs the instantaneous magnitude of the line-current derived component voltage of the aforesaid operating voltage may be improperly high throughout either the first or the second half cycle thereof, and the duration of this half cycle will be abnormally long. Such a distorted half cycle causes a fault located outside the steady state operating range of the relay to appear to the relay's static circuit means as though the fault were closer to the relay than it actually is, and a relay designed to operate in less than one cycle after the occurrence of a fault therefore has a tendency to overreach.

The tendency of distance relays to overreach can be compensated in the adjustment of the relays. Compensation for overreaching is obtained by adjusting the relays to operate at 10 percent to 20 percent lower impedance than that for which they would otherwise be adjusted if only steady state conditions were considered. This degree of compensation is not objectionable in some applications of distance relays. For example, if such relays are used to initiate blocking and tripping functions in a high-speed directional-comparison protective relaying system like that illustrated in copending patent application S.N. 256,622, Seeley, filed on Feb. 6, 1963 and assigned to the assignee of the present application, even a 15 percent overreach is acceptable. But the problem of overreach is quite critical where high-speed mho relays are used for "first zone" protection. The greater the first-zone overreach, the lesser the portion of a given power system section that can be reliably protected by first-zone mho relays.

Accordingly, it is a general object of the present invention to provide a high-speed static mho relay having a minimized tendency to overreach.

Another object of my invention is the provision, for protecting an A.C. electric power transmission line, of a static distance relay including improved means for deriving a line-current dependent voltage which remains substantially symmetrical even if the line current is appreciably offset on the incidence of a transmission line fault.

It is yet another objective to provide novel means adapted to be coupled to an A.C. electric power transmission line for developing a voltage related to line current by a predetermined constant impedance which approximates the impedance of the line during both steady state and transient conditions.

Another object of the invention is to provide, for protective relaying applications, improved transforming means whose transfer impedance is substantially a replica of transmission line impedance.

An additional object of the invention is the provision of a static distance relay using such transforming means and having an improved overreach characteristic.

A further object is the provision of an improved static mho relay utilizing the operating principle disclosed in the above-cited Warrington reissue patent and having a minimized tendency to overreach.

A more specific object of my invention is the provision of a novel static circuit means which employs transistors or the like and which is especially well suited for performing an instantaneous comparing function such as that which results in a mho operating characteristic when used in the relay which is shown and described in detail in a copending patent application S.N. 256,700, Mathews, filed on February 6, 1963, and assigned to the assignee of the present application.

In carrying out my invention in one form, novel transforming means is formed by providing an essentially unloaded transactor in combination with an instrument current transformer of conventional design. The primary windings of these two devices are interconnected in series for energization by an A.C. electric current. Since there is negligible secondary loading on the transactor, the voltage across its secondary winding leads primary current by substantially 90 electrical degrees. The secondary current derived by the current transformer energizes a resistive element which is provided in circuit with the secondary winding of this device, and the voltage drop across the resistive element will be substantially in phase with the primary current. The resistive element is serially connected to the secondary winding of the transactor to form a series RL circuit, and the net secondary voltage developed across this circuit is equal to the product of the primary current and an impedance having a resistive component R (contributed by the resistive element in the current transformer secondary circuit) and a reactive component $X_L$ (contributed by the transactor). The parameters of my transforming means can readily be chosen so that the aforesaid series circuit approximates the series RL characteristics of a high-voltage electric power transmission line, whereby its transfer impedance $\overline{Z}_R$ will be a substantial replica of transmission line impedance. If this transforming means is coupled to a homogeneous transmission line whose A.C. power source is generating a symmetrical sinusoidal voltage, it will develop a substantially symmetrical secondary voltage when energized by offset current on the occurrence of a bolted line fault.

In one aspect of my invention, I provide, for protecting an A.C. electric power transmission line, a static distance relay of the mho type which employs the above-described transforming means to develop a line-current representative voltage (proportional to $\overline{IZ}_R$). The relay also employs line-voltage responsive means capable of developing a voltage proportional to line voltage, and I vectorially combine both developed voltages to provide an operating voltage proportional to $\overline{IZ}_R - \overline{V}$. The operating voltage together with a line-voltage dependent reference voltage, derived by the aforesaid line-voltage responsive means, are both supplied to static circuit means of appropriate design. By static circuit means of appropriate design, I mean an arrangement of non-moving elements capable of producing an output control signal whenever a predetermined relationship between the operating and reference voltages supplied thereto is indicative of a fault condition on the line being protected. Such static circuit means may, for example, be constructed in accordance with the principle disclosed in the Warrington reissue patent, cited above, in which case it is responsive to the relative polarity of the operating voltage at a predetermined "pulsing" instant in each reference voltage cycle. Alternatively, the static circuit means may be arranged, like the mho relay which Hodges et al. claim in their above-cited patent, to respond to the phase relationship between operating and reference voltages. With either scheme, the overreach characteristic of the relay is improved by utilizing the aforesaid transforming means which can derive a substantially symmetrical voltage from line current though the latter is appreciably offset when a line fault first occurs.

The maximum ohmic reach of a mho relay of the foregoing design is dependent upon the magnitude of the replica impedance $Z_R$ of the means used for developing the line-current representative voltage. The power factor angle (i.e., the angle by which line current lags line voltage) at which maximum reach can be realized is known as the angle of maximum reach of the relay. In the case of the above-mentioned Warrington scheme, maximum reach is obtainable when the phase position of the line-current representative voltage, relative to line voltage, is such that it attains its peak magnitude of given polarity coincidentally with the predetermined pulsing instant of the reference voltage. According to Warrington, this occurs when the power factor angle is the same as the angle of the means for developing the voltage which is a function of line current, and the angle of maximum reach of such a relay is consequently equal to the arctangent of $X_L/R$. The same angle of maximum reach is normally obtained when the Hodges et al. scheme, as summarized above, is used, since at this particular angle the operating and reference voltages are in phase, which is their relationship for maximum reach in that relay. According to another aspect of the present invention, I have been able to improve significantly the protection afforded by such a relay by providing phase-shift means in association with the aforesaid line-voltage responsive means for introducing a predetermined phase displacement in its response to line voltage, this phase displacement effecting a lesser angle of maximum reach than the angle of $\overline{Z}_R$.

In yet another aspect of the invention, I have provided a unique transistor circuit capable of performing a pulsing and comparing function such as that required of the static circuit means of the above-summarized mho relay embodying the Warrington scheme. This circuit includes a pair of D.C. supply voltage terminals, first and second transistors, an RC pulse forming circuit, first and second input terminals adapted to be energized by A.C. polarizing and operating voltages, respectively, and an output terminal. The first transistor and the RC circuit are arranged to generate a gating pulse for energizing the output terminal once each cycle of the polarizing voltage, just as the voltage applied to the first input terminal, with respect to a predetermined one of the supply voltage terminals, changes from one polarity to the other. The second transistor is arranged when active to prevent effective energization of the output terminal by the aforesaid gating pulse, and its activation and inactivation is determined by the relative polarity of the operating voltage applied to the second input terminal. Accordingly, an output signal will be produced by the transistorized circuit only when the operating voltage has a predetermined polarity at the instant a gating pulse is generated.

My invention will be better understood and its various objects and advantages will be more fully appreciated from the following description taken in conjunction with the accompanying drawings in which.

Figure 1:
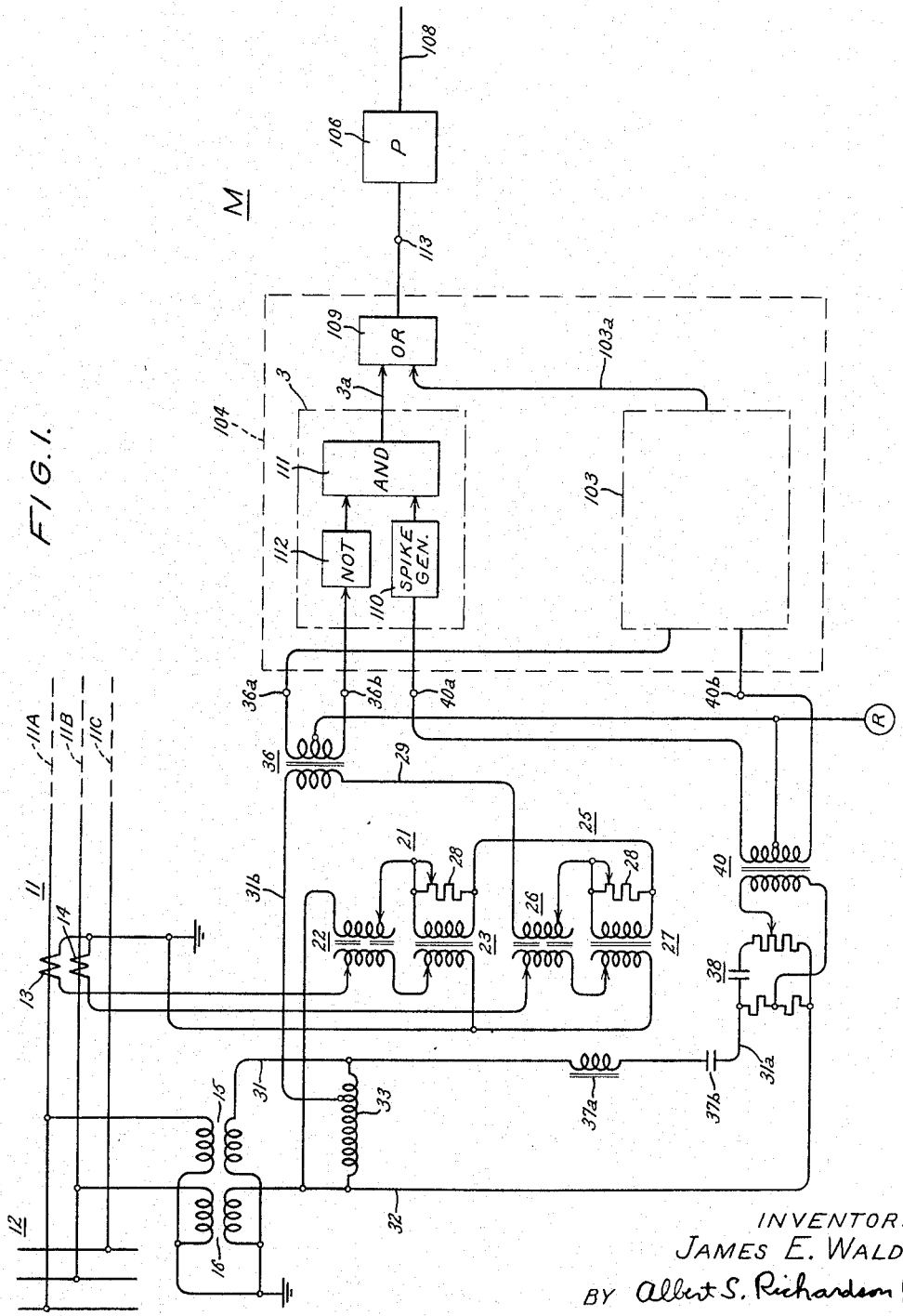
FIG. 1 is a schematic circuit diagram, partly in block form, of a static distance relay embodying my invention.

Referring now to FIG. 1, I have shown schematically and in block form, for the purpose of illustrating a preferred embodiment of my invention, a distance relay M for protecting a 3-phase alternating-current electric power transmission line 11 comprising conductors 11A, 11B and 11C. These phase conductors represent a section of a high-voltage electric power system which is used for conducting alternating current of power frequency, such as 60 cycles per second, from the illustrated "terminal" to utilization or load circuits connected to a distantly located end of the protected line 11.

Although for the sake of drawing simplicity it has not been shown in FIG. 1, the transmission line 11 is ordinarily connected at the illustrated terminal to the power source bus 12 by means of a 3-pole circuit interrupter of appropriate design.

It is the purpose of the protective relay M to initiate a predetermined control function, such as the activation of means for opening the circuit interrupter, in high-speed response to the occurrence of a phase fault on the protected line, i.e., upon the occurrence of a short circuit between two of the phase conductors comprising the line 11. In order to detect the occurrence and sense the direction of such a fault, the relay is coupled to the transmission line at the local terminal thereof by means comprising a pair of Y-connected instrument current transformers 13 and 14 associated, respectively, with conductors 11A and 11B, and by a pair of Y-connected instrument potential transformers 15 and 16 which are coupled respectively to the same two conductors. The secondary currents of the current transformers 13 and 14 are therefore representative of transmission line current flowing locally in phase conductors 11A and 11B, respectively, while the voltage derived across the secondary windings of the potential transformers 15 and 16 is proportional to the line-to-line voltage between these conductors. The relay M which is connected to these transformers in the manner shown in FIG. 1 is arranged to operate in response to certain critical relationships between these representative quantities arising upon the occurrence of a fault which involves both of the phase conductors 11A and 11B of the protected transmission line. Complete response to phase-to-phase faults involving conductors 11B and 11C or conductors 11C and 11A is obtained in practice by providing additional current and potential transformers coupled to the conductor 11C and by providing two more duplicate relays similarly connected thereto.

As can be seen in FIG. 1, the secondary circuit of current transformer 13 includes the primary of transforming means 21 which comprises a transactor 22 and an auxiliary current transformer 23, each of conventional construction, interconnected in series as shown. The secondary circuit of current transformer 14 includes the primary of similar transforming means 25 comprising another transactor 26 connected in series with auxiliary current transformer 27. According to my invention, the secondary of each of the transactors 22 and 26 has negligible resistive loading, while a rheostat 28 is connected across the secondary winding of each current transformer 23, 27. Therefore the transactor secondary voltage leads its A.C. primary current by almost 90 degrees, while the voltage drop across a rheostat 28 is substantially in phase with this primary current. The ratio of the net secondary voltage, developed across the serially interconnected combination of a rheostat and an "unloaded" transactor secondary winding, to the primary current is the transfer impedance of my transforming means, and it will be apparent that this transfer impedance simulates a series RL circuit energized by the same current.

As is shown in FIG. 1, the secondary circuits of both transforming means 21 and 25 are interconnected in polarity opposing series relationship between leads 29 and 32. With this arrangement a voltage representative of the vector difference between the currents flowing in conductors 11A and 11B at the local terminal of the protected transmission line is developed across the leads 29 and 32, this voltage being proportional to $\overline{I}\overline{Z}_R$ where $\overline{I}$ is line current and $\overline{Z}_R$ is an impedance determined by the parameters of the transforming means 21 and 25. The impedance $\overline{Z}_R$ is equal to $R+jX_L$, the magnitude of its in-phase component R being determined by the turns ratio of the comparison current transformers 23 and 27 and the resistance and adjustment of each of the two rheostats 28, and the magnitude of its reactive component $X_L$ being determined by the turns ratio and the dimensions of the air gap in the core of each transactor 22, 26. These design parameters are preferably so selected that $\overline{Z}_R$ closely approximates the impedance of the protected line 11, and since transmission line impedance is primarily characterized by resistance and inductance in series, $\overline{Z}_R$ can be considered a true replica impedance. The advantage of this feature of my invention is discussed hereinafter in connection with the description of FIG. 2.

The secondary windings of the Y-connected potential transformers 15 and 16 are connected between ground and leads 31 and 32, respectively. As can be seen in FIG. 1, an autotransformer 33 is connected between the leads 31 and 32. A lead 31b is connected to a tap of the autotransformer, and the voltage between the two leads 31b and 32 will be seen to be proportional to the line-to-line voltage across conductors 11A and 11B of the electric power system at the local terminal of the protected line. An isolating transformer 36 is connected from lead 31b to lead 29 as shown.

The isolating transformer 36 has a midtapped secondary winding. Opposite ends of the secondary winding are connected to terminals 36a and 36b, and its midtap is connected to a reference bus (identified by the encircled letter R) of a suitable source of D.C. supply voltage. The voltage developed across each half of the secondary winding of transformer 36 is dependent on the vectorial combination of a component derived from line voltage V and a component proportional to $\overline{I}\overline{Z}_R$. This secondary voltage (proportional to $\overline{I}\overline{Z}_R - \overline{V}$) comprises an A.C. operating quantity for the distance relay M. The relay is additionally energized in accordance with line voltage as reflected by the potential transformer secondary voltage taken across leads 31 and 32, with the lead 31 being connected through a series LC memory circuit, comprising inductance and capacitance elements 37a and 37b having a natural frequency of oscillation approximately equal to the power frequency, to a lead 31a. The leads 31a and 32 supply the relay with a line-voltage dependent A.C. reference quantity which, due to the memory circuit, is approximately two-thirds the magnitude of the steady state secondary voltage of the potential transformers 15 and 16.

The illustrated relay M is constructed and arranged to operate in response to predetermined relationships between the aforesaid operating and reference quantities characterizing the relationship between line voltage and current which exists at the local terminal of the protected line when a phase fault in the electric power system occurs within a predetermined distance thereof. It is designed to have inherent directional response, being well known in the art as a mho type relay. While the details of the circuitry for so responding to the operating and reference quantities may take other forms, a preferred embodiment of my invention utilizes a construction employing what is called a "block-spike" principle of operation. This principle is disclosed in the aforesaid reissue patent Re. 23,430-Warrington. The desired mho characteristic is obtained by making a comparison of the instantaneous values of the two components comprising the A.C. operating quantity (representative of $\overline{V}$ and $\overline{I}\overline{Z}_R$, respectively) every time the instantaneous magnitude of the line-voltage derived reference quantity attains a predetermined instant in successive half cycles thereof. If $\overline{I}\overline{Z}_R$ has the same polarity and a higher instantaneous magnitude than V at the instant this comparison is made, the relay will immediately produce an output control signal which is taken therefrom by means of a lead 108.

As is indicated in FIG. 1, the illustrated relay includes (1) a phase-shift circuit 38 for introducing a phase displacement in the A.C. reference quantity being supplied to the relay, with respect to the line voltage from which it is derived, (2) static circuit means 104 for producing an output signal in response to predetermined relationships between the operating and reference quantities supplied thereto, said relationships being indicative of the incidence of a phase fault within the operating range of this relay, and (3) a pulse stretching component 106 spontaneously responsive to the operation of 104 for providing a continuous output signal which energizes the lead 108 emanating therefrom.

The phase-shift circuit 38 is connected across the leads 31a and 32, and an isolating transformer 40 is connected thereto as is shown in FIG. 1. Opposite ends of the secondary winding of transformer 40 are connected to terminals 40a and 40b, and a tap midway therebetween is connected to the reference bus R. The A.C. voltage developed across each half of the secondary winding of this transformer lags the voltage between leads 31a and 32 by a fixed phase angle determined by the design and adjustment of the phase-shift circuit 38. It is referred to hereinafter as the polarizing voltage.

The polarizing voltage energizes the static circuit means 104 where periodic gating pulses are produced at successive instants of polarizing voltage zero. The phase-shift circuit 38 enables such a "pulsing" instant to be made to coincide to any predetermined instant in a line voltage half cycle. For example, a 90-degree phase shift causes the pulsing instant to occur when the instantaneous magnitude of line voltage is maximum, and the pulsing instant can be advanced, relative to this moment of line voltage peak magnitude, by using less phase shift. I prefer to adjust the circuit 38 so that polarizing voltage is retarded only 70 degrees, whereby the pulsing instant occurs 20 degrees ahead of the moment of peak line voltage. This is effectively the same as advancing the phase of the reference voltage by 20 degrees, with respect to line voltage from which it is derived, and then so arranging the circuitry that the gating pulse is produced just as the advanced reference voltage attains its maximum instantaneous magnitude.

The static circuit means 104 of the relay M, which is energized by the operating and polarizing voltages, utilizes the "block-spike" scheme referred to hereinbefore. It therefore is shown in FIG. 1 as comprising measuring and pulsing means for providing a pulsed output signal if the A.C. operating quantity ($\overline{IZ_R} - \overline{V}$) has the same polarity as the reference quantity when the instantaneous magnitude of the latter attains its 70-degree magnitude. More specifically, the measuring and pulsing means is arranged effectively to compare the instantaneous magnitudes of $\overline{IZ_R}$ and $\overline{V}$ 20 degrees in advance of the instantaneous magnitude of $\overline{V}$ becoming maximum, and to produce an output voltage pulse or signal if the comparison reveals that $\overline{IZ_R}$ at that moment has the same polarity and a higher instantaneous magnitude than $\overline{V}$. The instantaneous magnitude of $\overline{IZ_R}$ when this comparison is made can be shown to be equal to $$IZ_R \cos(\phi + 20° - \theta)$$

where $\phi$ is the power factor angle by which line current lags transmission line voltage and $\theta$ is the replica impedance angle by which $IZ_R$ leads line current. At the same time the instantaneous magnitude of $\overline{V}$ is $V \cos 20°$. Consequently, the means 104 will operate only if the ratio of line voltage to line current, as measured at the local line terminal, is less than $1.06Z_R \cos(\phi + 20° - \theta)$. This characterizes a mho relay whose operating characteristic when plotted on an R–X impedance diagram is a circle passing through the origin and whose angle of maximum reach is $\theta - 20°$.

In the illustrated embodiment of the mho relay M, the measuring and pulsing means 104 comprises identical "block-spike" components 3 and 103 connected in parallel to an OR logic unit 109. While the components 3 and 103 can take other forms for accomplishing their intended functions, each in its preferred form comprises a spike generator 110 the output of which supplies an input signal for an AND logic unit 111 whose other input is derived from a NOT logic unit 112. (These parts, which have been shown symbolically in FIG. 1, are revealed in still greater detail in FIG. 3, soon to be described.) The output of the AND unit 111 of component 3 is conveyed by a lead 3a to the OR unit 109, and an alternative input (lead 103a) for the latter unit is furnished by the output of a corresponding AND unit in the identical block-spike component 103. The OR unit 109, which may simply comprise a diode in series with each of the leads 3a and 103a, is connected to an output terminal 113 of the measuring and pulsing means 104, and an output voltage pulse is there produced whenever the AND unit 111 of either component 3 or 103 is turned on.

The AND unit 111 is turned on each time the generator 110 generates a spike of voltage of positive polarity with respect to the reference bus R, so long as the NOT input 112 to this unit is on at that same moment. By definition, the unit 112 is "on" in the absence of a positive input signal. The spike generator is responsive to the polarizing voltage. The polarizing voltage for spike generator 110 in the component 3 is taken from the upper end of the secondary winding of transformer 40 to which this generator is connected, via the terminal 40a as is shown in FIG. 1. Once every cycle, just as the polarizing voltage being applied to terminal 40a changes from negative to positive relative to the reference bus R, the generator 110 operates to produce a positive voltage spike (also referred to hereinafter as the gating pulse), and it will be observed that in component 3 this moment coincides, because of the 70-degree phase-shift circuit 38 referred to hereinbefore, to the instant that the instantaneous magnitude of the line-voltage dependent A.C. reference quantity attains a point 20 degrees ahead of its relatively positive peak.

The gating pulse generated by 110 turns on the AND unit 111 unless the associated NOT unit 112 is then off. The NOT unit 112 is responsive to the A.C. operating quantity supplied to the relay M, and it is turned off whenever an input voltage of positive polarity relative to the reference bus R is applied thereto. Since turn-on of the AND unit 111 by the spike generator 110 in component 3 is desired if the operating quantity is positive, the NOT unit has been arranged to be supplied by a relatively negative input voltage under such circumstances. This is accomplished by connecting the NOT unit 112 of component 3, via the terminal 36b, to the lower end of transformer 36, whereby this unit is energized in accordance with the polarity of $\overline{V} - \overline{IZ_R}$ and is "on" whenever the instantaneous value of $IZ_R$ is positive and of higher magnitude than V.

As is shown in FIG. 1, the companion block-spike component 103 is connected to the opposite-polarity terminals 36b and 40a. Component 103, which is the same as component 3 internally, serves to produce an output voltage pulse at lead 103a if the operating quantity is negative when the A.C. reference quantity is 20 degrees ahead of its relatively negative peak. Thus the components 3 and 103 are alternatively responsive during the "positive" and "negative" half cycles, respectively, of the quantities supplied thereto, and under operating conditions the static circuit means 104 derives at its output terminal 113 a succession of output voltage pulses spaced at half-cycle intervals.

The above-mentioned voltage pulses are utilized to energize the pulse stretching component 106 which is shown in FIG. 1 as a block labeled "P." The function of this component is to develop a sustained output control signal at the connected lead 108 in substantially instantaneous response to the receipt of a signal pulse from the static circuit means 104, the output signal being sustained continuously so long as the pulsed signals are recurring at one-half cycle intervals. Preferably this pulse stretching component of the relay M comprises the instantaneous pickup and time delay dropout circuit which is described and claimed in a copending patent application S.N. 321,072, Scharf, filed on Nov. 4, 1963, and assigned to the assignee of the present application.

Having described with reference to FIG. 1 the various parts of the mho relay M of my invention, consideration will now be given to FIG. 2 which is a conventional R–X impedance diagram illustrating the operating characteristic of the relay. The origin in this diagram represents the point in the electric power system where the current and potential transformers which supply line-voltage and line-current derived quantities to the relay are coupled thereto, while the abscissa R and ordinate $jX$ describe values of resistance and inductive reactance, respectively, as determined by the vectorial relationship between line voltage and current measured by these transformers. The circle identified by the reference number 115 represents the loci of apparent impedance values which define the steady state or static operating range of the relay M. Any phase fault on the protected line of such a nature that the impedance to the fault falls within the area circumscribed by the circle 115 will be within the operating range (ohmic reach) of the relay.

Figure 2:
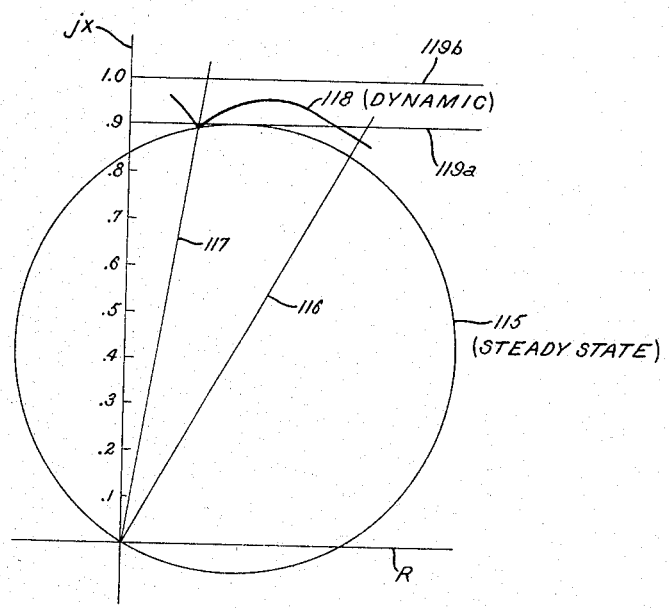
FIG. 2 is a graphical representation of the operating characteristics of the FIG. 1 relay, in terms of impedance.

The line 116 in FIG. 2 has been drawn at the angle of maximum reach of the delay. The line 117 has been drawn at the angle of the replica impedance $Z_R$, and the distance along this line from the origin to the circle 115 represents the magnitude of $Z_R$. The replica angle (arc tangent $X_L/R$) is preferably selected, by appropriate design and adjustment of my transforming means 21 and 25, to be equal to approximately 80 degrees. As has been explained hereinbefore, the angle of maximum reach has been made 20 degrees less than the angle of the replica impedance by providing the 70-degree phase-shift circuit 38 of my invention.

In FIG. 2 I have also indicated, by the line 118, the dynamic or transient operating characteristic ideally obtained by my relay. This characteristic is different than the steady state characteristic of the relay because of the overreach tendency which has been explained in the introductory portion of this specification. When a line fault occurs the resulting fault current is likely to be initially offset. If the angle of the fault impedance is equal to the angle of the replica impedance $Z_R$ (that is, if the impedance to the fault falls on line 117 of the R–X diagram), the $\overline{IZ_R}$ voltage derived from offset fault current will necessarily be like the line voltage at the local terminal which is symmetrical, and my relay will not appreciably overreach. For fault impedances whose angles are different than the replica angle, however, $IZ_R$ may be somewhat offset with the result that either its first or second half cycle will be distorted in a manner increasing the reach of the relay.

The preferred 80° angle of the replica impedance $Z_R$ is actually somewhat less than the angle of the impedance of a typical high-voltage transmission line protected by my relay. This is because a line fault is commonly accompanied by an arcing condition, and the addition of arc resistance to the resistive component of the line impedance, between relay and fault locations, makes the angle of the resultant fault impedance less than the angle of the line. The amount of arc resistance, within certain limits, is unpredictable. I have found that an 80° replica angle is optimum for minimizing the overreach of my relay, under all expectable fault conditions on the protected line.

The likelihood of arcing faults also makes it desirable in mho relays to select an angle of maximum reach that is appreciably less than the angle of the protected line. The operating characteristic of a relay having a 60-degree angle of maximum reach, as compared for example to 80 degrees, covers a greater range of possible fault impedances for a given length of line, because it embraces more arc resistance where the respective ends of the protected line are intersected by the mho operating characteristic. I have arranged the illustrated relay to have a 60° angle of maximum reach by using the 70-degree phase-shift circuit 38 described hereinbefore. This advances the instant of gating pulse generation in the static circuit means 104 of the relay M by 20° relative to the instant of line voltage peak magnitude, and it correspondingly reduces the angle of maximum reach of the relay relative to the angle of its replica impedance $Z_R$. It should be noted here that I can obtain the same result in a mho relay utilizing the operating principle of the above-cited Hodges et al. patent by introducing a 20-degree phase advance, relative to the line voltage, in both the reference voltage and the line-voltage derived component of the operating voltage.

The horizontal lines 119a and 119b in FIG. 2 indicate the improved overreach characteristic of my relay. The line 119a is drawn at the maximum steady state reactive reach of the relay which in this instance is set at 90 percent of the reactance of a power system section extending between two distantly spaced terminals. It will be observed that the reactive overreach of the relay is well below 10 percent.

Figure 3:
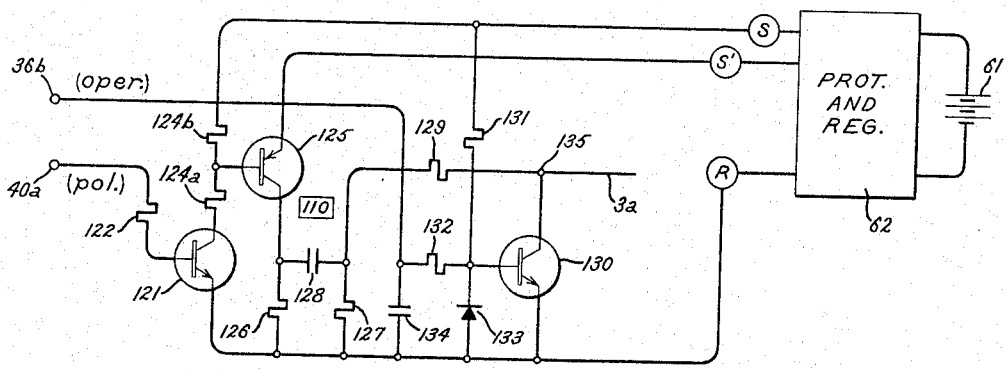
FIG. 3 is a circuit diagram of the components of FIG. 1 which are encompassed by broken line 3.

Turning next to FIG. 3, I have there set forth the details of a transistorized circuit for carrying out the functions of the block-spike component 3 of the subject relay in its preferred form, which component is shown in block form in the above-described FIG. 1. This circuit is supplied, via input terminal 36b, by an A.C. polarizing voltage and, via input terminal 40a, by an A.C. operating voltage, and additionally it receives control power from a source of regulated D.C. supply voltage which comprises, for example, a battery 61 having connected thereto suitable protection and regulating means 62. For convenience, I have used in FIG. 3 the encircled terminals R and S to represent, respectively, the common reference bus (energized from the negative terminal of the battery 61) and a supply voltage bus of positive polarity relative to the reference bus. The magnitude of the supply voltage is preferably about 20 volts. For convenience I also derive from this source a positive bias bus, represented by the encircled terminal S', which has a level of bias potential slightly less positive than the supply voltage bus S.

The circuitry illustrated in FIG. 3 includes an NPN transistor 121 whose emitter is connected directly to the reference bus R and whose base electrode is connected by way of a current limiting resistor 122 to the terminal 40a for energization by the polarizing voltage. The collector of transistor 121 is connected to the supply voltage bus S by way of a load impedance comprising a pair of resistors 124a and 124b in series. Whenever the polarizing voltage applied to terminal 40a is of positive polarity relative to the reference bus R and its instantaneous magnitude is above the relatively low threshold level required to effect forward current flow in the emitter-base junction of transistor 121, this transistor is active. This threshold level is only about 0.2 volt, and since the steady state value of polarizing voltage is much greater (e.g., 24 volts R.M.S.), its attainment is substantially coincident with an instant of polarizing voltage zero.

During the intervals of inactivation of the transistor 121, no current of appreciable magnitude can flow in its load impedance and hence there is negligible voltage drop across resistor 124b. But when activated by a positive half cycle of the polarizing voltage applied to terminal 40a, the emitter-collector circuit of transistor 121 readily conducts load current and the junction between resistors 124a and 124b becomes appreciably negative, with respect to the supply voltage bus S. This junction is connected to the base electrode of a normally inactive PNP transistor 125 whose emitter is connected directly to the positive bias bus S' and whose collector is connected through a load impedance 126 to the reference bus R. A portion of load current conducted by transistor 121 will follow a path through the emitter-base junction of transistor 125, thereby forward biasing the same, and the latter transistor is turned on and off simultaneously with the former.

As can be seen in FIG. 3, a series RC circuit comprising a resistor 127 and a capacitor 128 of relatively low capacitance (e.g. 0.027 microfarad) is connected in parallel relationship with the load resistor 126 of the transistor 125, with the resistor 127 being connected directly to the reference bus R. The junction between the components of this circuit is connected to the outgoing lead 3a via a resistor 129 and an output terminal 135 of the illustrated circuitry. So long as the transistor 125 is off, the level of potential at its collector is substantially the same as that of the reference bus R, and the capacitor 128 of the RC circuit is in a discharged state. The output terminal 135 is then deenergized. But each time transistor 125 becomes active, its collector potential will be elevated to a level nearly equal to that of the positive bias bus S', and the potential of the junction between resistor 127 and capacitor 128, due to the constant voltage characteristic of the latter, immediately becomes appreciably positive relative to the reference bus R. The capacitor now charges quickly, and the initial voltage across resistor 127 rapidly decays at a rate dependent upon the time constant of the charging circuit. I select a relatively short time constant, such as 0.1 millisecond, whereby the voltage thus produced across resistor 127 in response to the turn-on of transistor 125 endures for only a brief moment. This then is the spike of positive voltage (the gating pulse) referred to hereinbefore, and the combination of the two transistors 121 and 125 and the RC circuit 127, 128 is seen to comprise the spike generator 110 of the spike-block component 3 of the mho relay illustrated in FIG. 1.

The gating pulse generated across resistor 127 in the above-described manner is utilized to energize the outgoing terminal 135. However, the terminal is normally clamped to the reference bus R by the emitter-collector circuit of an NPN transistor 130 connected therebetween. As is shown in FIG. 3, the emitter of transistor 130 is connected directly to R, and its base electrode is connected through a bias resistor 131 to the supply voltage bus S. Consequently forward bias current is normally being supplied to the emitter-base junction of the transistor 130 and the transistor is effective to short down the aforesaid gating pulse and prevent energization of terminal 135 by voltage which is positive with respect to the reference bus R, unless this result is precluded by the application of a negative-going deactivating signal to the transistor 130. Such a negative-going deactivating signal is derived from the A.C. operating quantity which energizes terminal 36b, the base electrode of transistor 130 being connected to this terminal through a current limiting resistor 132 of much smaller resistance value than the bias resistor 131.

Whenever the voltage applied to terminal 36b is of negative polarity relative to the reference bus R and its instantaneous magnitude is greater than a predetermined critical amount (which is relatively small), the emitter-base junction of transistor 130 will be reverse biased and this transistor is inactive. During an interval of inactivation of the transistor 130, its emitter-collector circuit will be in a relatively high-impedance state and no load current of appreciable magnitude can be conducted thereby. A diode 133 connected in shunt with the emitter-base junction of transistor 130 and poled as shown in FIG. 3 is provided to protect this junction from damagingly high reverse voltage when the operating voltage applied to terminal 36b is at its most negative potential. A capacitor 134 is connected between terminal 36b and the reference bus R to minimize the possibility that transistor 130 might be turned off in response to negative-going extraneous transients appearing at terminal 36b upon the occurrence of a phase fault in the electric power system beyond the reach of the mho relay M.

The intervals or time blocks of inactivation of the transistor 130 coincide to the intervals during which the operating quantity $IZ_R - V$ is positive, for it is only then that input terminal 36b will be negative with respect to the reference bus R. If a gating pulse is generated across resistor 127 during such a block of inactivation, the potential level of the output terminal 135 is able to rise momentarily in a positive sense with respect to the reference bus, and current can flow into the connected lead 3a and energize the succeeding circuits being supplied by this lead while the capacitor 128 quickly charges. This energizing current comprises the output signal of my transistorized block-spike circuit as it is shown in FIG. 3, and the circuits supplied by the lead 3a are preferably designed for very sensitive response thereto.

While I have shown and described a preferred form of my invention by way of illustration, various modifications will occur to those skilled in the art. I contemplate therefore by the claims which conclude this specification to cover all such modifications as fall within the true spirit and scope of my invention.

What I claim as new and desire to secure by Letters Patent of the United States is:

1. A distance relay responsive to the occurrence of a fault on an electric power transmission line, comprising:
    (a) first means, responsive to line current, adapted to be coupled to the line for developing a first component voltage related to line current by a predetermined constant impedance;
    (b) second means, responsive to line voltage, adapted to be coupled to the line for developing a reference voltage dependent on line voltage;
    (c) third means connected to said first and second means for providing an operating voltage dependent on the vectorial combination of said first component voltage and a second component voltage derived from line voltage;
    (d) static circuit means connected to said second and third means for producing an output control signal in response to predetermined relationships between said operating and reference voltages, said predetermined relationships being indicative of the occurrence of a line fault within the ohmic reach of the relay; and
    (e) phase-shift means associated with said second means for introducing a predetermined phase displacement in its response to line voltage, said phase displacement effecting a reduced angle of maximum reach of the relay relative to the angle of said predetermined constant impedance.

2. The distance relay of claim 1 in which said first means comprises a transactor and a current transformer having serially interconnected primary windings adapted to be coupled to the line for energization in accordance with line current, with a resistive element being connected in circuit with the current transformer secondary winding, and with said resistive element being connected in series with the transactor secondary winding to form a series RL circuit across which the first component voltage is developed.

3. A distance relay responsive to the occurrence of a fault on an electric power transmission line, comprising:
    (a) first means adapted to be coupled to the line for developing a first component voltage related to line current by a predetermined constant impedance which approximates a true replica of line impedance;
    (b) second means adapted to be coupled to the line for deriving a reference voltage dependent on line voltage;
    (c) phase-shift means connected to said second means for effecting a predetermined phase displacement in the reference voltage with respect to the line voltage;
    (d) means connected to said first and second means for providing an operating voltage dependent on the vectorial combination of said first component voltage and another component voltage proportional to line voltage; and (e) static circuit means supplied by said operating and reference votlages and responsive to predetermined relationships therebetween for producing an output control signal, said predetermined relationships being indicative of the occurrence of a line fault within the operating range of the distance relay.

4. The distance relay of claim 3 in which the angle of said predetermined constant impedance is made approximately equal to 80 degrees.

5. The distance relay of claim 3 in which said predetermined phase displacement is made approximately equal to 20 degrees.

6. The distance relay of claim 3 in which said first means comprises a transactor and a current transformer having serially interconnected primary windings adapted to be coupled to the line for energization in accordance with line current, with a resistive element being connected in circuit with the current transformer secondary winding, and with said resistive element being connected in series with the transactor secondary winding to form a series RL circuit across which the first component voltage is developed.

7. A static mho relay for protecting an A.-C. electric power transmission line comprising:

(a) first means adapted to be coupled to the line for deriving a reference voltage dependent on line voltage;

(b) second means including a phase-shift circuit connected to said first means for developing an A.-C. polarizing voltage having a predetermined fixed phase relationship to said reference voltage;

(c) third means including a series replica impedance circuit adapted to be coupled to the line for developing a first component voltage related to line current by a predetermined constant impedance;

(d) fourth means connected to said first and third means for providing an A.-C. operating voltage dependent on the vector difference between said first component voltage and a second component voltage proportional to line voltage; and (e) static circuit means connected to said second and fourth means for energization by said polarizing and operating voltages, said static circuit means including means controlled by the polarizing voltage for periodically enabling the static circuit means to produce a pulsed output control signal when the line voltage attains a predetermined instant in successive cycles thereof if the operating voltage is then indicative of a fault condition on the protected line, said phase-shift circuit being so arranged that said predetermined instant occurs at a point in a line voltage cycle ahead of the instant at which the maximum instantaneous magnitude of line voltage is attained.

8. The static mho relay of claim 7 in which said series replica impedance circuit comprises a transactor and a current transformer having serially interconnected primary windings adapted to be coupled to the line for energization in accordance with line current, with a resistive element being connected in circuit with the current transformer secondary winding, and with said resistive element being connected in series with the transactor secondary winding to form a series RL circuit across which the first component voltage is developed 9. A static mho relay for protecting an electric power transmission line comprising:

(a) transforming means adapted to be coupled to the line for developing a line-current representative voltage, said transforming means comprising a transactor and a current transformer having serially interconnected primary windings adapted to be coupled to the line for energization in accordance with line current, with a resistive element being connected in circuit with the current transformer secondary winding, and with said resistive element being connected in series with the transactor secondary winding to form a series RL circuit across which the line-current representative voltage is developed;

(b) line-voltage responsive means adapted to be coupled to the line for developing a first electric quantity dependent on line voltage;

(c) means connected to said transforming means and to said line-voltage responsive means for developing a second electric quantity dependent on the vectorial combination of said line-current representative voltage and a voltage representative of line voltage; and (d) static circuit means supplied by said first and second electric quantities for producing an output control signal in response to predetermined relationships between said quantities, said predetermined relationships being indicative of the occurrence of a fault on the protected line.

10. Transforming means comprising:

(a) a transactor having primary and secondary windings;

(b) a current transformer having primary and secondary windings, the primary winding of said current transformer being connected in series with the primary winding of said transactor for energization by an A.-C. electric current;

(c) a resistive element connected in circuit with the secondary winding of said current transformer; and (d) means connecting said resistive element in series with the secondary winding of said transactor to form a series RL circuit across which a voltage proportional to said electric current is developed.

11. Static circuit means comprising:

(a) a pair of D.-C. supply voltage terminals;

(b) first and second transistors each having a collector, emitter and base electrode;

(c) the emitter-collector circuit of the first transistor being connected between said terminals, in series with a load impedance;

(d) a first input terminal adapted to be energized by an A.-C. polarizing voltage;

(e) means connected to said first input terminal and to the emitter-base circuit of said first transistor for effecting activation of the first transistor throughout alternate half cycles of said polarizing voltage;

(f) a series RC circuit having a relatively low time constant connected in parallel relationship with said load impedance, said RC circuit including a capacitor connected to the first transistor and a resistor connected to a predetermined one of said supply voltage terminals;

(g) an output terminal connected to the junction of said resistor and capacitor;

(h) the emitter-collector circuit of said second transistor being connected directly between said output terminal and said predetermined supply voltage terminal;

(i) a second input terminal adapted to be energized by an A.-C. operating voltage; and (j) means connecting the base electrode of said second transistor to said second input terminal to control the activation of the second transistor according to the relative polarity of the operating voltage.

12. In combination:

(a) a source of D.-C. supply voltage comprising a reference terminal and another terminal adapted to be energized by supply voltage of predetermined polarity relative to the reference terminal;

(b) first and second transistors each having a collector, emitter and base electrode;

(c) first and second impedance means;

(d) the emitter-collector circuit of the first transistor and the first impedance means being serially interconnected between said terminals, with the first impedance means connected directly to said reference terminal;
(e) the emitter-collector circuit of the second transistor and said second impedance means being serially interconnected between said terminals, with the emitter of the second transistor connected directly to said reference terminal;
(f) a first input terminal, adapted to be energized by A.-C. polarizing voltage, connected to the base electrode of said second transistor, whereby the second transistor is activated in response to said first input terminal being energized by a voltage of said predetermined polarity relative to said reference terminal;
(g) means connecting said second impedance means to said first transistor for effecting forward current flow in the emitter-base junction of the first transistor, thereby activating the first transistor, upon activation of said second transistor;
(h) a series RC circuit connected in parallel relationship with said first impedance means, said RC circuit including a capacitor connected to said first transistor and a resistor connected to said reference terminal;
(i) an output terminal connected to the junction of said capacitor and resistor;
(j) a third transistor having a collector, emitter and base electrode, with the collector of the third transistor being connected directly to said output terminal and the emitter of the third transistor being connected directly to said reference terminal, the third transistor when active preventing energization of the output terminal by voltage of said predetermined polarity relative to the reference terminal; and
(k) a second input terminal, adapted to be energized by A.-C. operating voltage, connected to the base electrode of said third transistor, whereby the third transistor is maintained in an inactive state in response to said second input terminal being energized by a voltage having a polarity, relative to said reference terminal, opposite to said predetermined polarity.

13. The combination set forth in claim 12 in which means is provided to interconnect the base electrode of the third transistor and the source of D.-C. supply voltage for rendering the third transistor active whenever the second input terminal is deenergized.

14. A static mho relay for an A.-C. electric power transmission line comprising: first means adapted to be coupled to the line for developing an A.-C. polarizing voltage dependent on line voltage; second means adapted to be coupled to the line for developing an A.-C. operating voltage dependent on the vector difference between two component voltages proportional to line current and voltage, respectively; and static circuit means connected to said first and second means for energization by said polarizing and operating voltages, said static circuit means including:
(a) a first transistor arranged for activation throughout alternate half cycles of said polarizing voltage;
(b) an RC circuit connected to said first transistor for generating a gating pulse of relatively short duration in response to said first transistor becoming active at the beginning of each of said alternate half cycles;
(c) an output terminal connected to said RC circuit for energization by said gating pulse; and
(d) a second transistor connected to said output terminal to prevent effective energization of the output terminal by said gating pulse when active, said second transistor being arranged to be alternately active and inactive for substantially half-cycle intervals during every cycle of said operating voltage.

References Cited by the Examiner
UNITED STATES PATENTS

| | | | |
|---|---|---|---|
| Re. 23,430 | 11/1951 | Warrington | 317—51 |
| 2,879,454 | 3/1959 | Hodges et al. | 317—36 X |
| 2,922,109 | 1/1960 | Hodges et al. | 317—36 X |
| 3,192,442 | 6/1965 | Warrington et al. | 317—36 |

MILTON O. HIRSHFIELD, *Primary Examiner.*

R. V. LUPO, *Assistant Examiner.*